US012159037B2

(12) United States Patent
Mori et al.

(10) Patent No.: US 12,159,037 B2
(45) Date of Patent: Dec. 3, 2024

(54) MEMORY SYSTEM AND COMMAND DETERMINATION METHOD

(71) Applicant: KIOXIA CORPORATION, Tokyo (JP)

(72) Inventors: Haruka Mori, Kawasaki Kanagawa (JP); Mitsunori Tadokoro, Fujisawa Kanagawa (JP); Akinori Nagaoka, Kodaira Tokyo (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 17/903,049

(22) Filed: Sep. 6, 2022

(65) Prior Publication Data

US 2023/0136654 A1 May 4, 2023

(30) Foreign Application Priority Data

Oct. 29, 2021 (JP) .................................. 2021-177618

(51) Int. Cl.
*G06F 3/06* (2006.01)

(52) U.S. Cl.
CPC .......... *G06F 3/0613* (2013.01); *G06F 3/0659* (2013.01); *G06F 3/0679* (2013.01)

(58) Field of Classification Search
CPC ...... G05B 13/00–048; G05B 15/00–02; G05B 17/00–02; G06F 1/00–3296;

(Continued)

(56) References Cited

U.S. PATENT DOCUMENTS 3,587,054 A * 6/1971 Byrne .................. G06F 9/4831
                                                        701/17
5,272,701 A * 12/1993 Tsuruoka ............ G06F 13/3625
                                                        370/408

(Continued)

FOREIGN PATENT DOCUMENTS

| JP | 6373559 B2 | 8/2018 |
| JP | 2020-016954 A | 1/2020 |
| WO | 2016/117190 A1 | 7/2016 |

OTHER PUBLICATIONS

Command Types; Prasoon Suresh; BMC Documentation; Jul. 8, 2016; retrieved from https://docs.bmc.com/docs/PATROLAgent/113/command-types-766670798.html on May 1, 2024 (Year: 2016).*

(Continued)

*Primary Examiner* — Daniel C. Chappell
(74) *Attorney, Agent, or Firm* — Kim & Stewart LLP

(57) ABSTRACT

A memory system includes a non-volatile memory including first and second memory chips connected to a channel, each chip outputting a first signal indicating whether the chip is in a busy state, a first queue storing commands to be executed by the first chip, a second queue storing commands to be executed by the second chip, a processor configured to issue a second signal indicating whether a command in the first or second queue is a first-type or a second-type command, the first-type command causing the first or second chip to be in the busy state longer than the second-type command, a first arbiter selecting from the first and second queues a command to be executed next based on the first and second signals, and an interface controller sending the selected command via the channel to the first or second memory chip.

18 Claims, 11 Drawing Sheets

(58) Field of Classification Search
CPC .............. G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 18/00–41; G06F 17/00–40; G06F 21/00–88; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G06N 3/00–126; G06N 5/00–048; G06N 7/00–08; G06N 10/00; G06N 20/00–20; G06N 99/00–007; G06T 1/00–60; G06V 30/00–43; G11B 20/00–24; G11B 33/00–1493; G11C 11/00–5692; G11C 13/00–06; G11C 14/00–009; G11C 15/00–06; G11C 16/00–3495; G11C 17/00–18; G11C 2207/00–229; G11C 2216/00–30; H01L 25/00–50; H01L 2225/00–1094; H03M 7/00–707; H04L 9/00–38; H04L 12/00–66; H04L 41/00–5096; H04L 49/00–9094; H04L 61/00–59; H04L 67/00–75
See application file for complete search history.

(56) References Cited

U.S. PATENT DOCUMENTS

| | | | | |
|---|---|---|---|---|
| 5,353,404 | A * | 10/1994 | Abe | .......................... G06T 1/60 |
| | | | | 345/522 |
| 5,535,214 | A * | 7/1996 | Shiobara | ............... H04L 12/433 |
| | | | | 370/455 |
| 8,145,828 | B2 * | 3/2012 | Ouchi | ................. G06F 11/3062 |
| | | | | 711/E12.001 |
| 9,134,919 | B2 | 9/2015 | Oh | |
| 10,318,210 | B2 | 6/2019 | Ishii | |
| 2003/0005239 | A1 * | 1/2003 | Dover | ................. G06F 13/1642 |
| | | | | 711/150 |
| 2015/0071003 | A1 * | 3/2015 | Numata | ............... G11C 7/1087 |
| | | | | 365/185.18 |
| 2017/0212833 | A1 * | 7/2017 | Stelmakh | ............... G11C 16/16 |
| 2017/0286008 | A1 * | 10/2017 | Kim | ..................... G06F 3/0685 |
| 2018/0039425 | A1 * | 2/2018 | Li | ........................... G06F 3/064 |
| 2018/0173640 | A1 * | 6/2018 | Jiang | .................. G06F 12/0895 |
| 2020/0026466 | A1 | 1/2020 | Takano | |
| 2020/0301613 | A1 * | 9/2020 | Yamazaki | ............. G06F 3/0679 |
| 2023/0135020 | A1 * | 5/2023 | Byun | ................... G11C 7/1015 |
| | | | | 711/154 |

OTHER PUBLICATIONS

N. Chatterjee et al., "Architecting an Energy-Efficient DRAM System for GPUs," 2017 IEEE International Symposium on High Performance Computer Architecture (HPCA), Austin, TX, USA, 2017, pp. 73-84, doi: 10.1109/HPCA.2017.58. (Year: 2017).*

J.-Y. Shi, A.-N. An, K. Li, Y. Hao, P.-Y. Liu and Y. Kang, "Optimization of shared memory controller for multi-core system," 2010 10th IEEE International Conference on Solid-State and Integrated Circuit Technology, Shanghai, China, 2010, pp. 287-289, doi: 10.1109/ICSICT.2010.5667755. (Year: 2010).*

\* cited by examiner

MEMORY SYSTEM AND COMMAND DETERMINATION METHOD

CROSS-REFERENCE TO RELATED APPLICATION(S)

This application is based upon and claims the benefit of priority from Japanese Patent Application No. 2021-177618, filed Oct. 29, 2021, the entire contents of which are incorporated herein by reference.

FIELD

Embodiments described herein relate generally to a memory system and a command determination method.

BACKGROUND

A solid state drive (SSD) including a NAND flash memory is one known example of a memory system. In SSDs, a technique of operating a plurality of memory chips connected to identical channels in parallel in bank units is adopted. This technique may be referred to as bank interleaving or the like.

DETAILED DESCRIPTION

Certain embodiments provide a memory system and a command determination method capable of improving a processing capacity.

In general, according to one embodiment, a memory system includes a non-volatile memory including first and second memory chips both connected to a first channel. Each of the first and second memory chips is configured to output a first signal indicating whether the respective first or second memory chip is in a busy state. The memory system further includes a first queue that stores one or more commands to be executed by the first memory chip, a second queue that stores one or more commands to be executed by the second memory chip, and a processor. The processor is configured to issue a second signal indicating whether a command stored in the first or second queue is a first-type command or a second-type command, the first-type command causing the first or second memory chip to be in the busy state for longer than the second-type command. The memory system further includes a first arbiter configured to select from the first and second queues a command to be executed next based on the first and second signals, and a first memory interface controller configured to send the selected command to the first or second memory chip via the first channel.

Hereinafter, certain example embodiments will be described with reference to the drawings.

Figure 1:
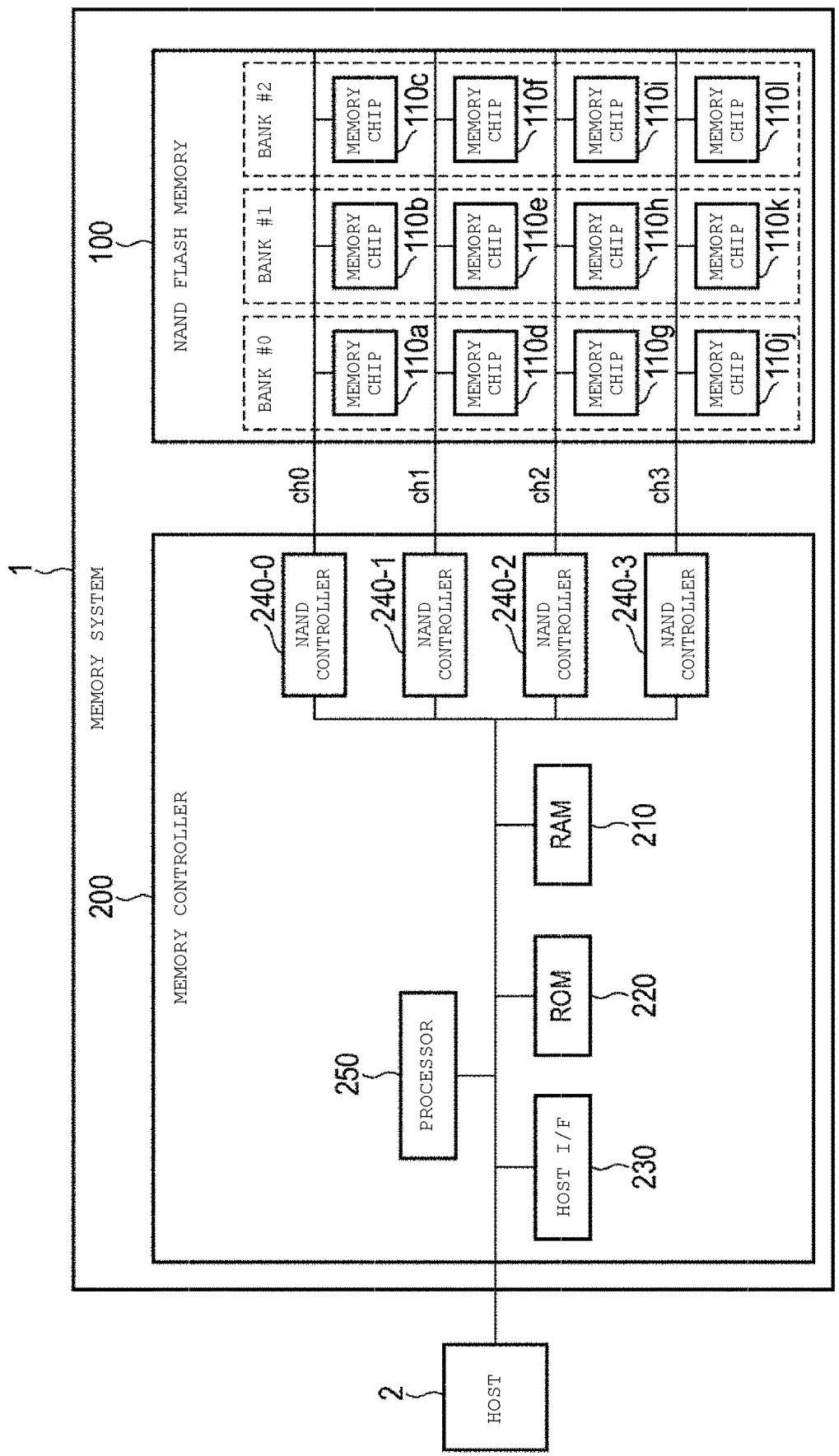
FIG. 1 is a block diagram illustrating a memory system according to an embodiment.

FIG. 1 is a block diagram of a memory system 1 according to an embodiment. The memory system 1 can be connected to a host device 2. The memory system 1 can accept an access request (e.g., a read request, a write request, or the like) from the host device 2. The communication of signals between the memory system 1 and the host device 2 is performed in accordance with, for example, PCIe, which is one of interface standards. The host device 2 is an information processing apparatus outside the memory system 1. The host device 2 is, for example, an information processing apparatus such as a personal computer or a server, a tester device, a manufacturing apparatus, an imaging apparatus such as a still camera or a video camera, a mobile terminal such as a tablet computer or a smartphone, a game device, or an in-vehicle terminal such as a car navigation system.

The memory system 1 includes a non-volatile memory 100, a memory controller 200, a first channel ch0, a second channel ch1, a third channel ch2, and a fourth channel ch3. Hereinafter, when it is not necessary to distinguish between the first channel ch0, the second channel ch1, the third channel ch2, and the fourth channel ch3, those channels ch0-ch3 are simply referred to as the channels ch.

The non-volatile memory 100 stores data non-volatilely. The non-volatile memory 100 is, for example, a NAND flash memory, a magnetoresistive random access memory (MRAM), a phase change random access memory (PRAM), a resistive random access memory (ReRAM), or a ferroelectric random access memory (FeRAM).

The memory controller 200 controls the non-volatile memory 100. For example, the memory controller 200 writes data instructed to be written by the host device 2 into the non-volatile memory 100, reads the data instructed to be read by the host device 2 from the non-volatile memory 100, and transmits the read data to the host device 2.

The channels ch are each a group of wirings. Each channel ch include one or more I/O signal lines and one or more control signal lines. An I/O signal line is, for example, a signal line for communication of data, an address, and a command. A control signal line is, for example, a signal line for communication of a write enable (WE) signal, a read enable (RE) signal, a command latch enable (CLE) signal, an address latch enable (ALE) signal, and a write protect (WP) signal. A chip enable signal is a signal for enabling a memory chip 110, and is asserted at a low level in this example.

Next, an internal configuration of the non-volatile memory 100 will be described. The non-volatile memory 100 includes a plurality of banks (banks #0, #1, and #2). When it is not necessary to distinguish between the banks #0, #1, and #2, those banks are simply referred to as banks #.

Each bank is a collection of a plurality of memory chips. The bank #0 includes memory chips 110a, 110d, 110g, and 110j. The bank #1 includes memory chips 110b, 110e, 110h, and 110k. The bank #2 includes memory chips 110c, 110f, 110i, and 110l. Hereinafter, when it is not necessary to distinguish between the memory chips 110a to 110l, the memory chips are simply referred to as the memory chips 110 or the memory chips.

The memory chip 110 is an integrated circuit (IC) chip including a plurality of non-volatile elements. The memory chip 110 writes data and reads data in units called pages including, for example, a plurality of memory cells. A unique physical address is assigned to each page.

Next, an internal configuration of the memory controller 200 will be described. The memory controller 200 includes a random access memory (RAM) 210, a read only memory (ROM) 220, a host interface (I/F) 230, and a plurality of controllers 240-0, 240-1, 240-2, and 240-3, and a processor 250. The memory controller 200 is configured as, for example, a system-on-a-chip (SoC) or a plurality of chips. Hereinafter, when it is not necessary to distinguish between the controllers 240-0, 240-1, 240-2, and 240-3, those controllers are simply referred to as the controllers 240. The RAM 210, the ROM 220, the host interface 230, the controllers 240, and the processor 250 are connected to each other by a bus. One or more of the RAM 210, the ROM 220, the host I/F 230, the controllers 240, and the processor 250 may be disposed outside the memory controller 200.

The RAM 210 functions as a cache, a buffer, and a working area. The RAM 210 is, for example, a static random access memory (SRAM), a dynamic random access memory (DRAM), or a combination of the DRAM and the SRAM. Data received from the host device 2 is stored in the RAM 210. Further, data read from the non-volatile memory 100 is stored in the RAM 210. The RAM 210 may be provided outside the memory controller 200.

The ROM 220 is a memory to which new information cannot be written. The ROM 220 stores, for example, firmware used by the processor 250. The firmware is software including data and the like for a plurality of commands related to the memory chips 110. The plurality of commands related to the memory chips 110 are, for example, a read sense command, a program command, a data-in command, and a data-out command. The firmware may be stored in the non-volatile memory 100.

The host interface 230 is a circuit configured to execute communication with external devices. The host interface 230 performs communication of information (e.g., an access request, a response, and data) between the host device 2 and the memory controller 200.

The controller 240 is hardware such as a control circuit for controlling the memory chips 110. The controller 240-0 is connected to the memory chips 110a, 110b, and 110c via the first channel ch0. The controller 240-1 is connected to the memory chips 110d, 110e, and 110f via the second channel ch1. The controller 240-2 is connected to the memory chips 110g, 110h, and 110i via the third channel ch2. The controller 240-3 is connected to the memory chips 110j, 110k, and 110l via the fourth channel ch3. The controller 240-0 can operate a plurality of memory chips connected to the channel ch0 in parallel (bank interleaving). The same applies to the controllers 240-1, 240-2, and 240-3.

The processor 250 is hardware for executing an instruction set recorded in software. The processor 250 is, for example, a central processing unit (CPU). The processor 250 controls the entire memory controller 200 by executing the firmware.

The firmware includes data necessary to generate a busy period signal indicating whether a busy period of the memory chip 110 that executes a read sense command is longer than a certain period.

In the same manner, the firmware includes data necessary to generate a busy period signal indicating whether a busy period of the memory chip 110 that executes a program command, a data-in command, or a data-out command is longer than a certain period. The busy period is a period of a state in which the memory chip 110 does not accept any command or instruction from the outside (e.g., the host device 2).

The processor 250 generates a busy period signal based on the data described above. The processor 250 issues the generated busy period signal.

A time for a read sense command or a program command transmitted to the memory chip 110 to occupy the I/O signal line is shorter than a time for a data-in command or a data-out command transmitted to the memory chip 110 to occupy the I/O signal line.

A busy period required for the memory chip 110 to execute a read sense command or a program command is longer than a busy period required for the memory chip 110 to execute a data-in command and a data-out command.

Figure 2:
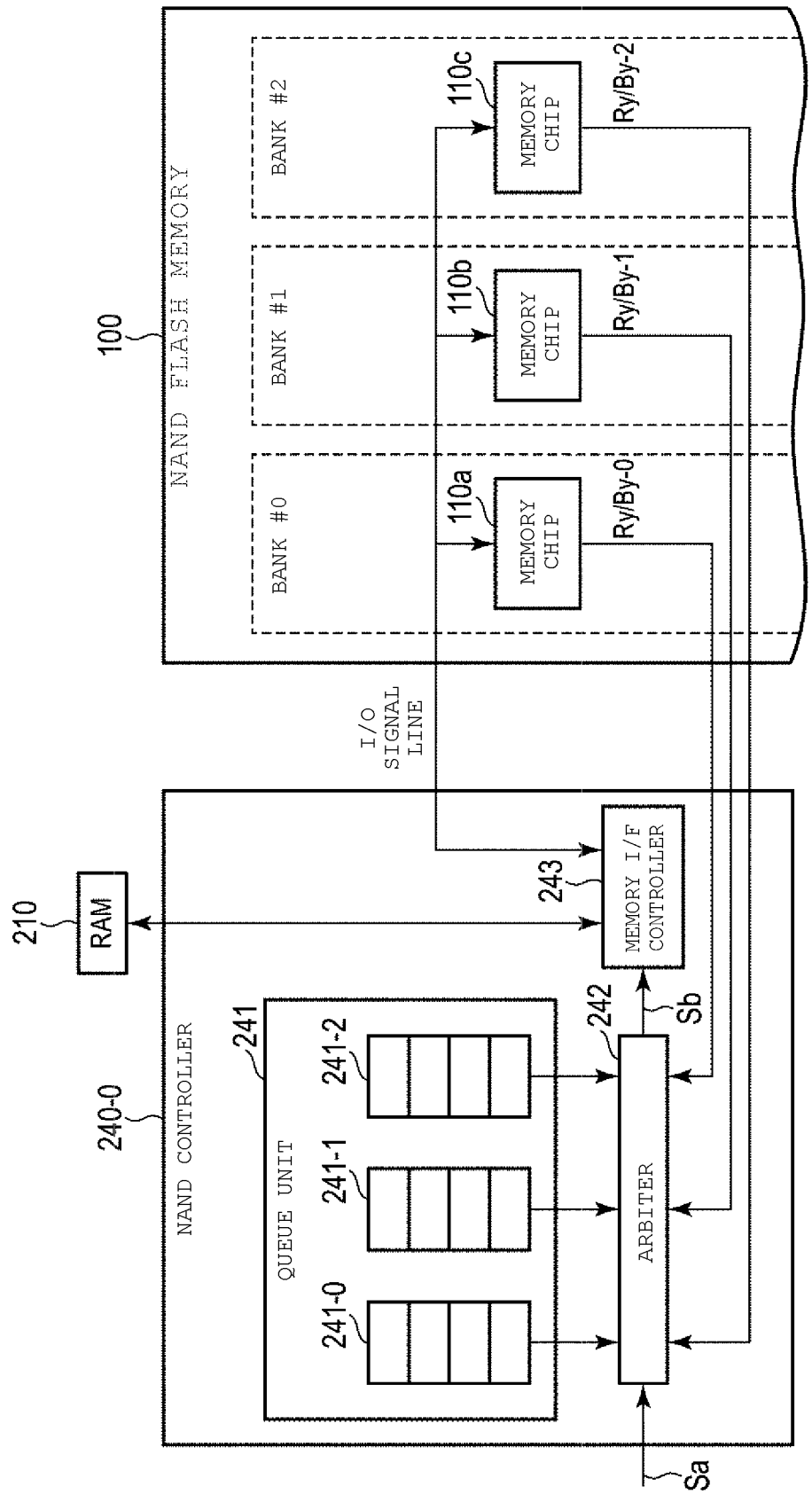
FIG. 2 is a block diagram illustrating a controller 240-0 and a connection relationship between the controller 240-0 and memory chips 110a, 110b, and 110c.

FIG. 2 is a block diagram illustrating the controller 240-0 and a connection relationship between the controller 240-0 and the memory chips 110a to 110c. The configurations of the controllers 240-0 to 240-3 are the same. Further, the configurations of the memory chips 110a to 110l are the same. Therefore, description for a configuration of a controller not illustrated in FIG. 2 and description for a connection relationship between the controller and a memory chip not illustrated in FIG. 2 will be omitted.

The memory chip 110a of the bank #0, the memory chip 110b of the bank #1, and the memory chip 110c of the bank #2 connected to the controller 240-0 share one I/O signal line. That is, a plurality of memory chips 110 connected to the same channel ch are connected to one I/O signal line.

The memory chip 110a outputs a ready/busy signal Ry/By-0 indicating whether the memory chip 110a is in a busy state or a ready state in which an instruction is acceptable from the outside. The memory chip 110b outputs a ready/busy signal Ry/By-1 indicating whether the memory chip 110b is in the busy state or the ready state. The memory chip 110c outputs a ready/busy signal Ry/By-1 indicating whether the memory chip 110c is in the busy state or the ready state. Hereinafter, when it is not necessary to distinguish between the signals Ry/By-0, Ry/By-1, and Ry/By-2, those signals Ry/By-0, Ry/By-1, and Ry/By-2 are simply referred to as Ry/By #.

The controller 240-0 includes a queue unit 241, an arbiter 242, and a memory interface (I/F) controller 243.

The queue unit 241 includes three command queues 241-0, 241-1, and 241-2, corresponding to the three banks #0, #1, and #2 (three memory chips 110a, 110b, and 110c). The command queues 241-0, 241-1, and 241-2 have a one-to-one correspondence with the banks #0, #1, and #2. Hereinafter, when it is not necessary to distinguish between the command queues 241-0, 241-1, and 241-2, these command queues are referred to as the command queues 241-#.

Each command queue 241-# has a queue structure capable of storing a plurality of commands. The queue structure is, for example, a first-in first-out (FIFO) structure or a first-in, last-out (FILO) structure. A command queue 241-# stores either or both of a command having a period of being in a busy state longer than a certain period or a command having a period of being in the busy state less than or equal to the certain period. Hereinafter, a period of being in the busy state is referred to as a busy period. A command having a busy period longer than the certain period is called a first command (first-type command). A command having a busy period equal to or less than the certain period is called a second command (second-type command).

The command queue 241-0 stores commands to be executed by the memory chip 110a of the bank #0. The commands are issued by the processor 250. The commands are stored in the command queue 241-0 in the reception order.

The command queue 241-1 stores commands to be executed by the memory chip 110b of the bank #1. The commands are issued by the processor 250. The commands are stored in the command queue 241-1 in the reception order.

The command queue 241-2 stores commands to be executed by the memory chip 110c of the bank #2. The commands are issued by the processor 250. The commands are stored in the command queue 241-2 in the reception order.

The arbiter 242 is a processing circuit or a processor connected to the command queues 241-#. The command queue 241-0 outputs the command stored at its head. This output command is input to the arbiter 242. The command queue 241-1 outputs the command stored at its head. This output command is input to the arbiter 242. The command queue 241-2 outputs the command stored at its head. This output command is input to the arbiter 242.

The ready/busy signal Ry/By-0 output from the memory chip 110a, the ready/busy signal Ry/By-1 output from the memory chip 110b, and the ready/busy signal Ry/By-2 output from the memory chip 110c are input to the arbiter 242. A busy period signal Sa generated by the processor 250 is also input to the arbiter 242.

Based on the ready/busy signal Ry/By-0, the ready/busy signal Ry/By-1, the ready/busy signal Ry/By-2, and the busy period signal Sa, the arbiter 242 determines which of the commands from the command queues 241-0, 241-1, and 241-2 is to be executed next by the memory chip 110 according to a command determination method, which will be described below.

The arbiter 242 issues a signal Sb to the memory interface controller 243. When a first command is selected according to the command determination method, the signal Sb includes information indicating the first command. The signal Sb including the information indicating a first command is referred to as a signal Sb1. Further, when a second command is selected according to the command determination method, the signal Sb includes information indicating the second command. The signal Sb including the information indicating a second command is referred to as a signal Sb2.

The memory interface controller 243 controls transmission and reception of data between the RAM 210 and the memory chip 110 based on the signal Sb.

When executing a read sense command, the memory interface controller 243 instructs the memory chip 110 to prepare for reading data. For example, when reading data from the memory chip 110a among the memory chips 110a to 110c of the channel ch0, a low-level chip enable signal is input to the memory chip 110a, and a high-low level chip enable signal is input to the memory chips 110b and 110c. The execution of the read sense command involves a waiting time. However, the execution of the read sense command does not involve occupation of the I/O signal line.

When executing a data-out command, the memory interface controller 243 reads the data prepared by the memory chip 110. For example, when a low-level chip enable signal is input to the memory chip 110a and a high-low level chip enable signal is input to the memory chips 110b and 110c, data can be read from the memory chip 110a by using one I/O signal line. The data-out command uses the I/O signal line. Therefore, the execution of the data-out command involves occupation of the I/O signal line.

When executing a data-in command, the memory interface controller 243 instructs the memory chip 110 to prepare for writing data. For example, when data is written to the memory chip 110a among the memory chips 110a, 110b, and 110c of the channel ch0, a low-level chip enable signal is input to the memory chip 110a, and a high-low level chip enable signal is input to the memory chips 110b and 110c. The data-in command uses the I/O signal line. Therefore, the execution of the data-in command involves occupation of the I/O signal line.

When executing a program command, the memory interface controller 243 writes the data prepared by the memory chip 110 to the memory chip. For example, when a low-level chip enable signal is input to the memory chip 110a and a high-low level chip enable signal is input to the memory chips 110b and 110c, data can be written into the memory chip 110a by using one I/O signal line. The execution of the program command involves a waiting time. However, the execution of the program command does not involve occupation of the I/O signal line.

Figure 3:
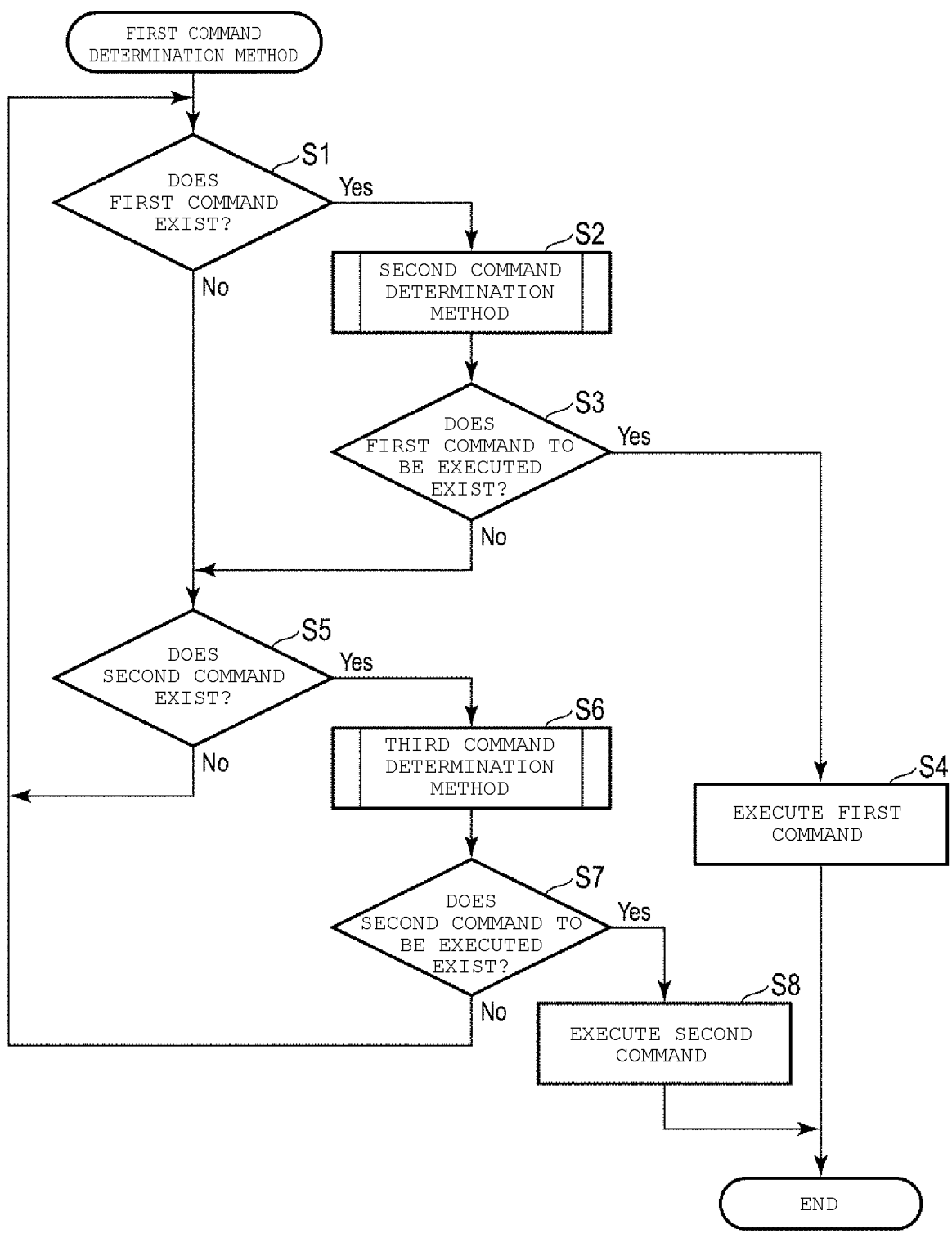
FIG. 3 is a flowchart of a first command determination method according to an embodiment.

Next, a first command determination method according to an embodiment performed by the arbiter 242 will be described. FIG. 3 is a flowchart of the first command determination method according to an embodiment. The first command determination method is a method of determining a command to be executed next among commands stored in the command queue 241-#.

The arbiter 242 determines whether a first command exists in the command queue 241-# based on the busy period signal Sa (S1).

When the first command exists in the command queue 241-# (Yes in S1), the arbiter 242 executes a second command determination method (S2). The second command determination method is a method of determining whether a first command which is executable is stored in the command queue 241-#.

After the execution of the second command determination method is completed, the arbiter 242 determines whether there is a first command that is to be executed with priority over a second command (S3).

When there is a first command to be executed with priority over a second command (Yes in S3), the arbiter 242 issues a signal Sb1 to the memory interface controller 243. Upon receiving the signal Sb1, the memory interface controller 243 causes the memory chip 110 to execute the first command (S4). The case where a first command to be executed with priority over a second command exists is a case where a process (S13) which will be described below is executed.

After the execution of the first command (S4), the arbiter 242 ends the first command determination method (end).

When a first command does not exist in the command queue 241-# (No in S1), or when a first command exists in the command queue 241-# but is not a first command to be executed with priority over a second command (No in S3), the arbiter 242 determines whether a second command exists in the command queue 241-# based on a busy period signal Sa (S5). The case where a first command to be executed with priority over a second command is not present in the command queue 241-# is a case of Yes in a process (S14) which will be described below.

When a second command exists in the command queue 241-# (Yes in S5), the arbiter 242 executes a third command determination method (S6). The third command determination method is a method of determining whether a second command which is executable is stored in the command queue 241-#.

After the execution of the third command determination method is completed, the arbiter 242 determines whether a second command to be executed exists in the command queue 241-# (S7).

When a second command to be executed exists in the command queue 241-# (Yes in S7), the arbiter 242 issues a signal Sb2 to the memory interface controller 243. Upon receiving the signal Sb2, the memory interface controller 243 causes the memory chip 110 to execute the second command (S8). The case where a second command to be executed exists is a case where a process (S23) which will be described below is executed.

After the execution of the second command (S8), the arbiter 242 ends the first command determination method (end).

When a second command is not in the command queue 241-# (No in S5), the arbiter 242 next determines whether a first command is present (S1).

When a second command to be executed is not in the command queue 241-# (No in S7), the arbiter 242 next determines whether a first command is present in the command queue 241-# (S1). The case where a second command to be executed is not present is a case of Yes in a process (S24) which will be described below.

Figure 4:
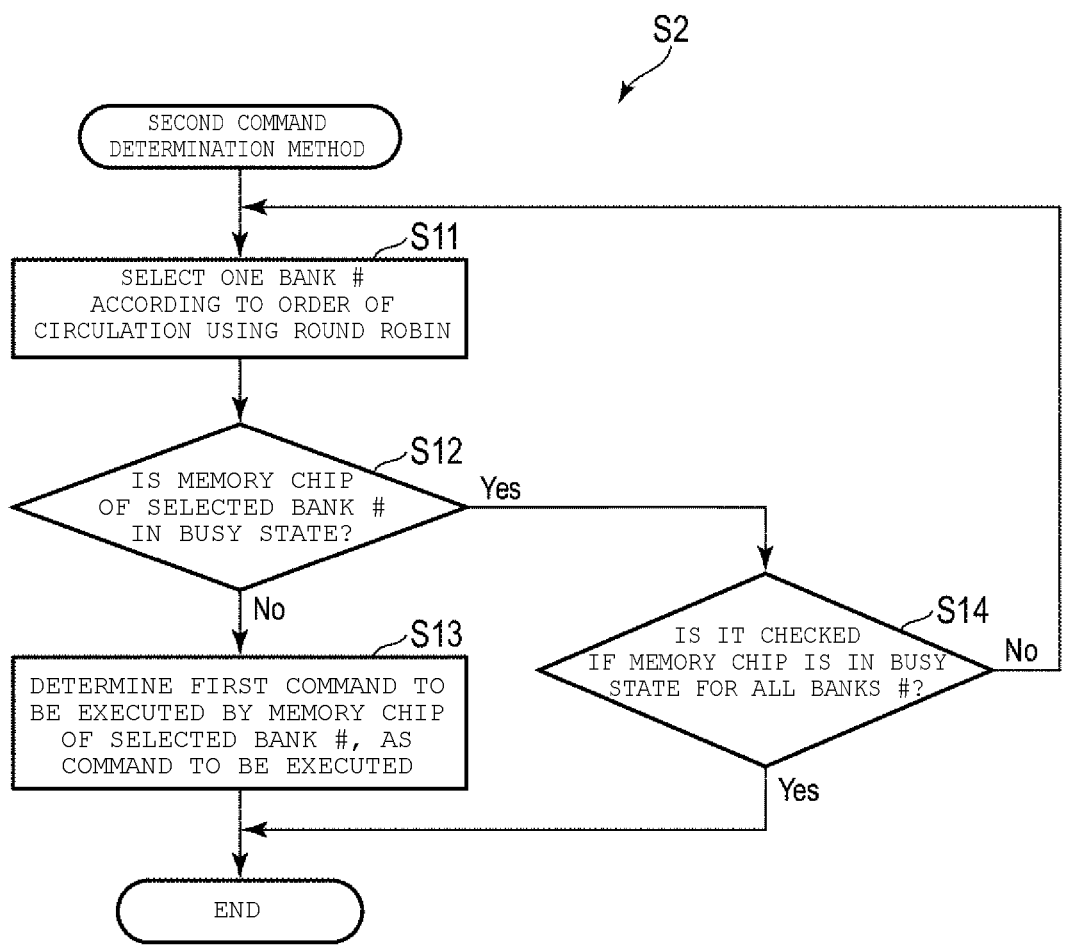
FIG. 4 is a flowchart of a second command determination method according to an embodiment.

Next, the second command determination method will be described. FIG. 4 is a flowchart of the second command determination method according to an embodiment.

The arbiter 242 selects one bank # according to an order of circulation using, for example, a round robin method (S11).

Next, the arbiter 242 determines whether a memory chip of the selected bank # is in a busy state based on the ready/busy signal Ry/By # (S12).

When the memory chip of the selected bank # is not in the busy state (No in S12), the arbiter 242 selects a first command as a command to be executed by the memory chip of the selected bank # (S13).

When the first command is selected to be executed by the memory chip of the selected bank # (S13), the arbiter 242 ends the second command determination method (end).

When the memory chip of the selected bank # is in the busy state (Yes in S12), the arbiter 242 determines whether the busy state of the memory chip has been checked for all the banks other than the selected bank # (S14).

When the busy state of a memory chip is not yet checked for all the other banks besides the selected bank # (No in S14), the arbiter 242 selects another bank # (S11).

When the busy state of the memory chip has been checked for all the banks other than the selected bank # (Yes in S14), the arbiter 242 ends the second command determination method (end).

Figure 5:
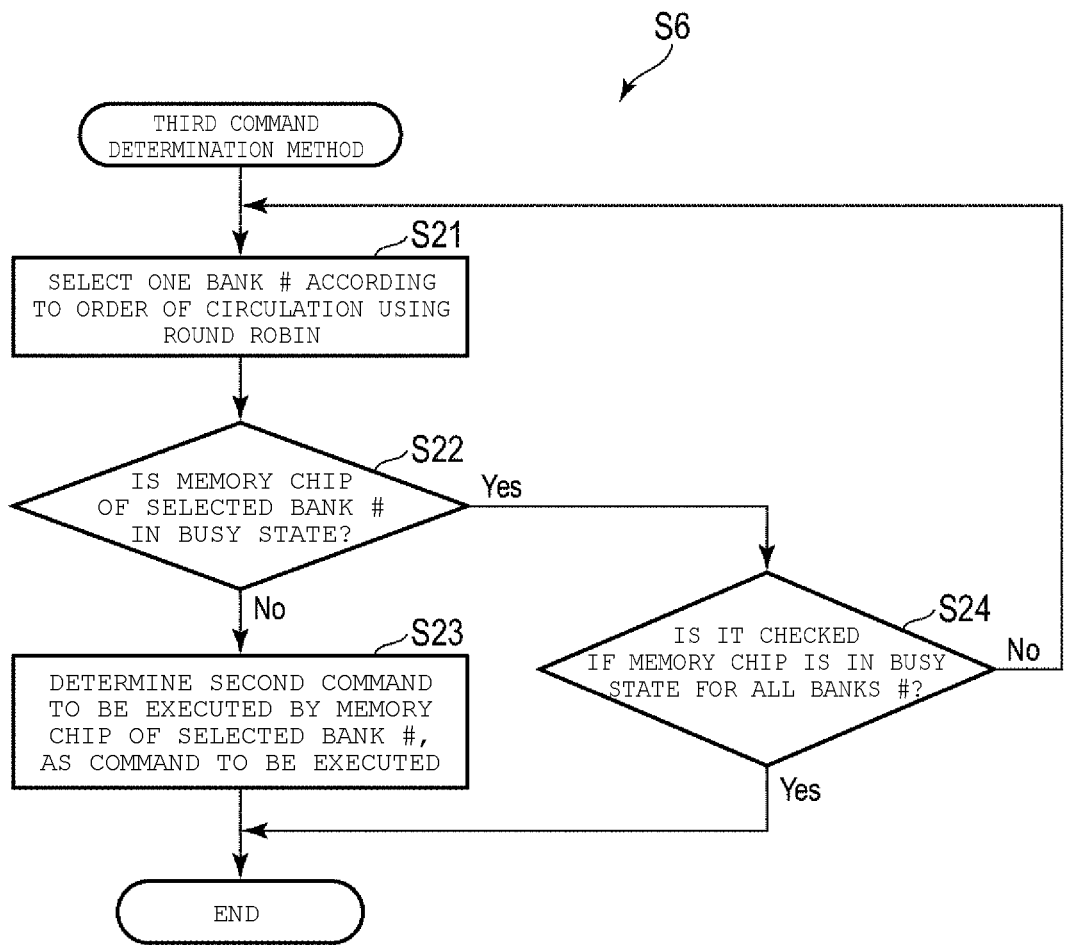
FIG. 5 is a flowchart of a third command determination method according to an embodiment.

Next, the third command determination method will be described. FIG. 5 is a flowchart of the third command determination method according to an embodiment.

The arbiter 242 selects one bank # according to an order of circulation using a round robin method or the like (S21).

Next, the arbiter 242 determines whether a memory chip of the selected bank # is in a busy state based on the ready/busy signal Ry/By # (S22).

When the memory chip of the selected bank # is not in the busy state (No in S22), the arbiter 242 selects a second command as a command to be executed by the memory chip of the selected bank # (S23).

When the second command is selected to be executed by the memory chip of the selected bank # (S23), the arbiter 242 ends the third command determination method (end).

When the memory chip of the selected bank # is in the busy state (Yes in S22), the arbiter 242 determines whether the busy state of the memory chip has been checked for all the banks other than the selected bank # (S24).

When the busy state of the memory chip has not been checked for all the banks # other than the selected bank #(No in S24), the arbiter 242 selects another bank # (S21).

When the busy state of the memory chip has been checked for all the banks # other than the selected bank # (Yes in S24), the arbiter 242 ends the third command determination method (end).

Figure 6:
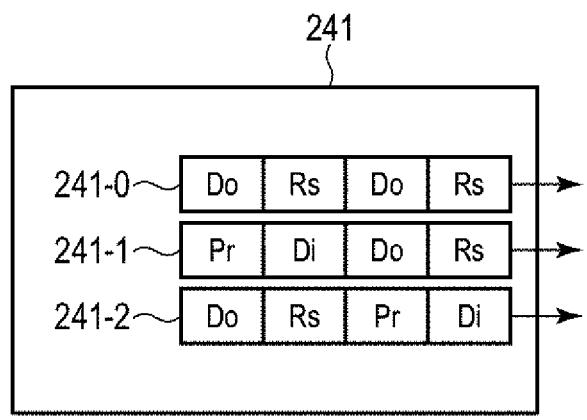
FIG. 6 depicts commands stored in a command queue according to an embodiment.

Next, the first command determination method according to an embodiment will be described using an example scenario. FIG. 6 depicts commands stored in the command queue 241-0, the command queue 241-1, and the command queue 241-2. In FIG. 6, the notation "Rs" indicates a read sense command, "Do" indicates a data-out command, "Di" indicates a data-in command, and "Pr" indicates a program command.

Figure 7:
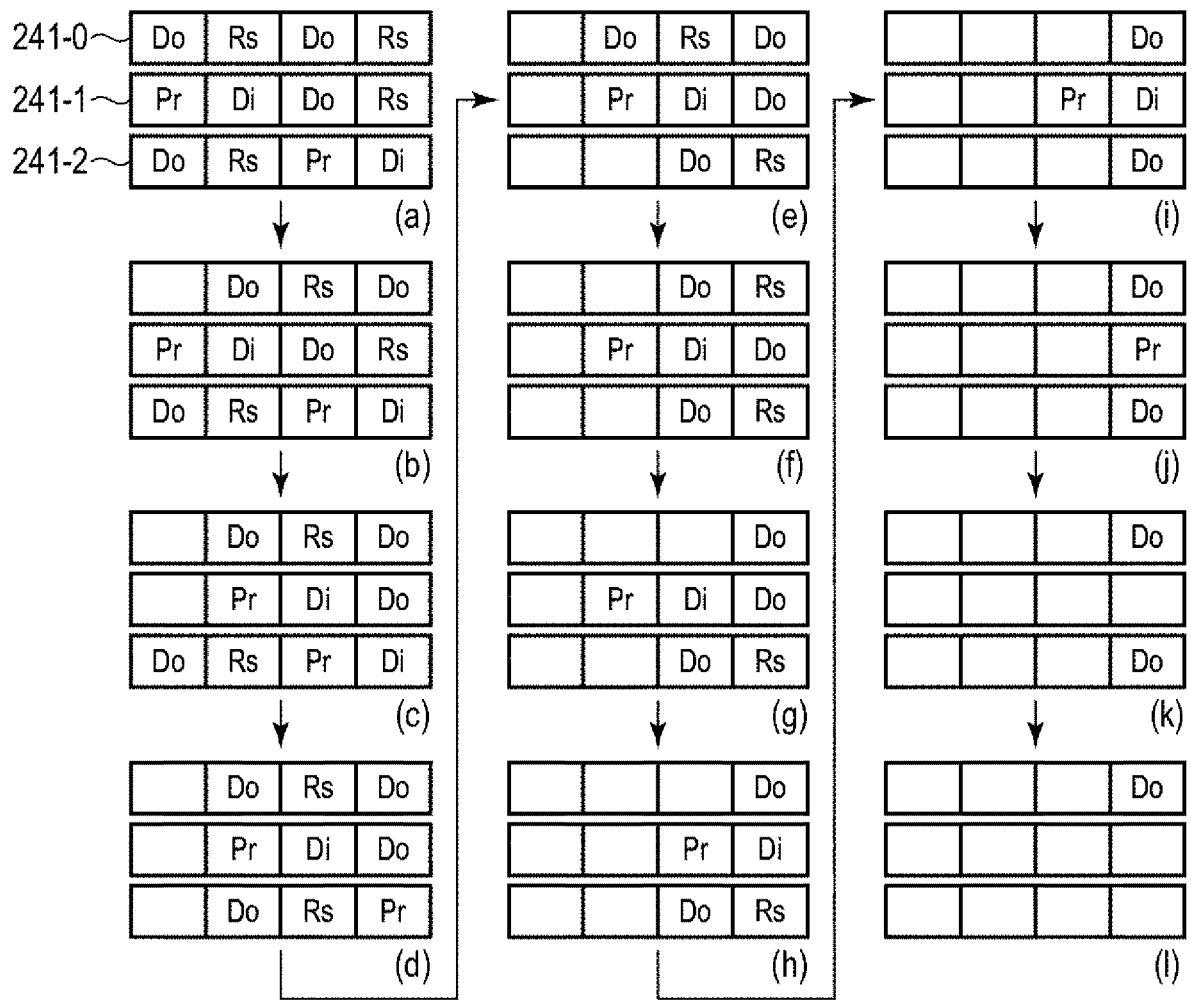
FIG. 7 depicts temporal changes of commands stored in a command queue according to an embodiment.

FIG. 7 depicts temporal changes of the commands stored in the command queue 241-0, the command queue 241-1, and the command queue 241-2. For the sake of simplicity, the reference numerals 241-0, 241-1, and 241-2 are omitted in parts (b)-(l) of FIG. 7.

Figure 8:
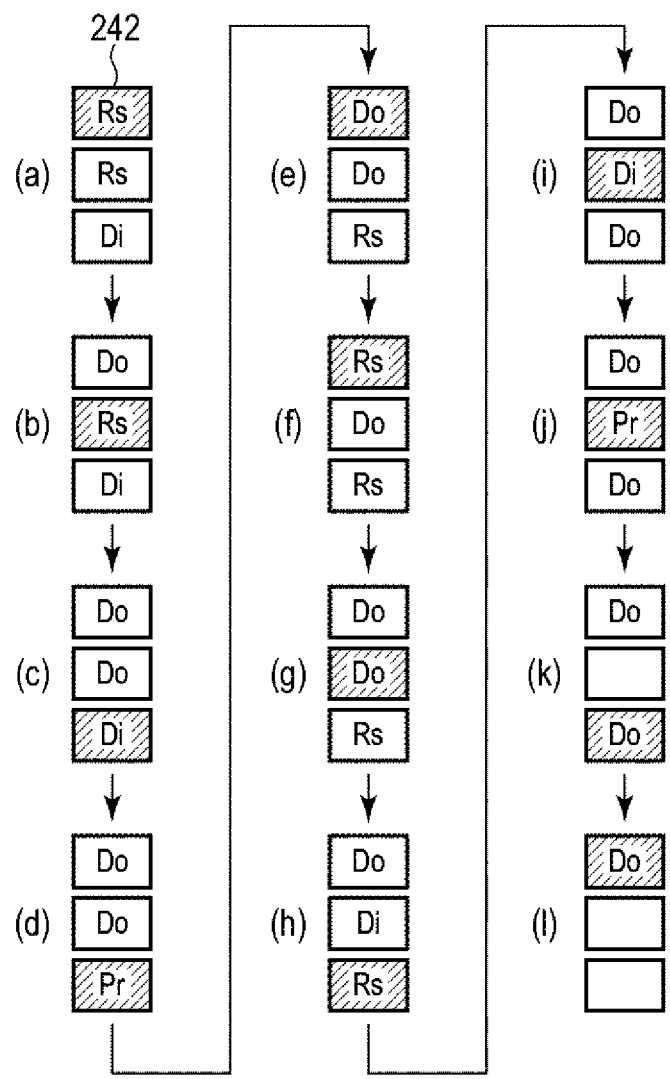
FIG. 8 depicts temporal changes of commands input to an arbiter according to an embodiment.

FIG. 8 depicts temporal changes of commands input to the arbiter 242. For the sake of simplicity, the reference numeral 242 is omitted in parts (b)-(l) of FIG. 8. In (b)-(l) of FIG. 8, a command in a hatched entry is a command selected by the arbiter 242 as a command to be preferentially executed.

Figure 9:
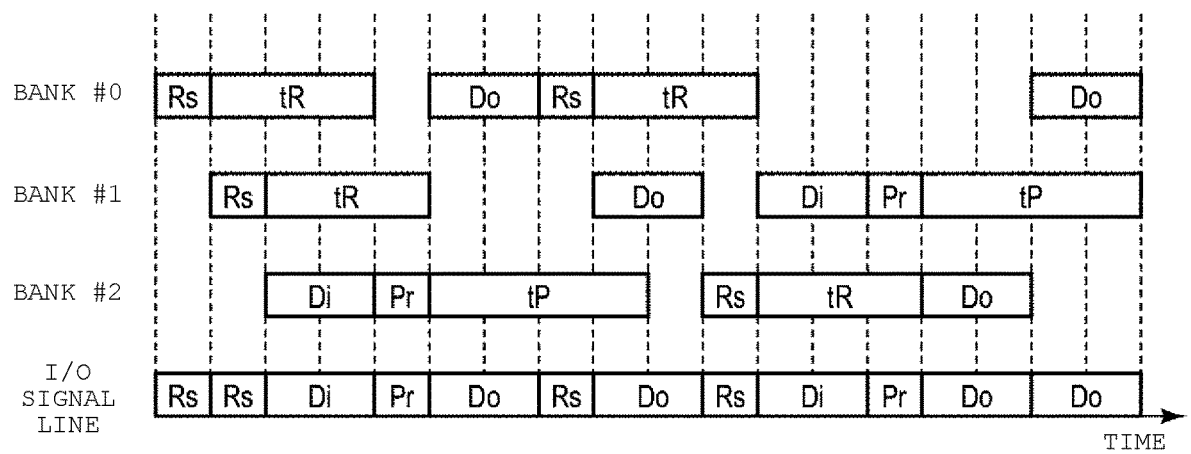
FIG. 9 is a timing chart illustrating an order of commands executed by a first command determination method according to an embodiment.

FIG. 9 is a timing chart illustrating an order of commands executed by the first command determination method according to an embodiment. In FIG. 9, the notation "tR" indicates a period (a waiting time) in which a memory chip that executes read sense command (Rs) is in a busy state, and "tP" indicates a period during which a memory chip that executes a program command (Pr) is in the busy state. Furthermore, FIG. 9 illustrates a timing chart of signals flowing in an I/O signal line, corresponding to the various commands: read sense command (Rs), data-in command (Do), data-in command (Di), and program command (Pr).

As illustrated in FIG. 6, a read sense command (Rs) (which is first-type command) is stored at a head of the command queue 241-0, read sense command (Rs) is stored at a head of the command queue 241-1, and a data-in command (Di) (which is a second-type command) is stored at a head of the command queue 241-2. As a result, Rs, Rs, and Di are input to the arbiter 242, as illustrated in (a) of FIG. 8.

The arbiter 242 performs the process in S1, the process in S2, and the process in S3 in FIG. 3. As a result, as illustrated in (a) of FIG. 8, the read sense command (Rs) in the upper stage of the depicted arbiter 242 is selected as the command to be executed. The selected command (Rs) is executed by the memory chip of the bank #0 as shown in FIG. 9.

After that, as illustrated in (b) of FIG. 7, the command at the head of the command queue 241-0 is a data-out command (Do) (which is a second-type command), the command at the head of the command queue 241-1 is read sense command (Rs), and the command at the head of the command queue 241-2 is a data-in command (Di)). As a result, Do, Rs, and Di are input to the arbiter 242, as illustrated in (b) of FIG. 8.

The arbiter 242 performs the process in S1, the process in S2, and the process S3 in FIG. 3. As a result, as illustrated in (b) of FIG. 8, Rs in the middle stage of the depicted arbiter 242 is selected as the command to be executed. This selected command (Rs) is executed by the memory chip of the bank #1 as shown in FIG. 9.

After that, as illustrated in (c) of FIG. 7, the command at the head of the command queue 241-0 is a data-out command (Do), the command at the head of the command queue 241-1 is a data-out command (Do), and the command at the head of the command queue 241-2 is a data-in command (Di). As a result, Do, Do, and Di are input to the arbiter 242, as illustrated in (c) of FIG. 8.

The arbiter 242 performs the process in S1, the process in S5, the process in S6, and the process in S7 in FIG. 3. As a result, as illustrated in (c) of FIG. 8, data-in command (Di) at the lower stage of the depicted arbiter 242 is selected as the command to be executed. The selected command (Di) is executed by the memory chip of the bank #2 as shown in FIG. 9.

After that, as illustrated in (d) of FIG. 7, the command at the head of the command queue 241-0 is a data-out command (Do), the command at the head of the command queue 241-1 is also a data-out command (Do), and the command at the head of the command queue 241-2 is a program command (Pr) (which is a first-type command). As a result, Do, Do, and Pr are input to the arbiter 242, as illustrated in (d) of FIG. 8.

The arbiter 242 performs the process in S1, the process in S2, and the process S3 in FIG. 3. As a result, as illustrated in (d) of FIG. 8, the program command (Pr) is selected as the command to be executed. The selected command (Pr) is executed by the memory chip of the bank #2 as shown in FIG. 9.

After that, as illustrated in (e) of FIG. 7, the command at the head of the command queue 241-0 is a data-out command (Do), the command at the head of the command queue 241-1 is also a data-out command (Do), and the command at the head of the command queue 241-2 is a read sense command (Rs). As a result, Do, Do, and Rs are input to the arbiter 242, as illustrated in (e) of FIG. 8.

The arbiter 242 performs the process in S1, the process in S2, the process in S3, the process in S5, the process in S6, and the process in S7 in FIG. 3. As a result, as illustrated in (e) of FIG. 8, the data-out command Do in the upper stage of the depicted arbiter 242 is selected as the command to be executed. The selected command (Do) is executed by the memory chip of the bank #0 as shown in FIG. 9.

After that, as illustrated in (f) of FIG. 7, the command at the head of the command queue 241-0 is a read sense command (Rs), the command at the head of the command queue 241-1 is a data-out command (Do), and the command at the head of the command queue 241-2 is another read sense command (Rs). As a result, Rs, Do, and Rs are input to the arbiter 242, as illustrated in (f) of FIG. 8.

The arbiter 242 performs the process in S1, the process in S2, and the process S3 in FIG. 3. As a result, as illustrated in (f) of FIG. 8, the Rs at the upper stage (corresponding to Rs at the head of the command queue 241-0 in (f) of FIG. 7) is selected as the command to be executed. The selected command (Rs) is executed by the memory chip of the bank #0 as shown in FIG. 9.

After that, as illustrated in (g) of FIG. 7, the command at the head of the command queue 241-0 is Do, the command at the head of the command queue 241-1 is Do, and the command at the head of the command queue 241-2 is Rs. As a result, Do, Do, and Rs are input to the arbiter 242, as illustrated in (g) of FIG. 8.

The arbiter 242 performs the process in S1, the process in S2, the process in S3, the process in S5, the process in S6, and the process in S7 in FIG. 3. As a result, as illustrated in (g) of FIG. 8, the data-out command (Do) at a middle stage of the depicted arbiter 242 is selected as the command to be executed. The selected command (Do) is executed by the memory chip of the bank #1 as shown in FIG. 9.

After that, as illustrated in (h) of FIG. 7, the command at the head of the command queue 241-0 is Do, the command at the head of the command queue 241-1 is Di, and the command at the head of the command queue 241-2 is Rs. As a result, Do, Di, and Rs are input to the arbiter 242, as illustrated in (h) of FIG. 8.

The arbiter 242 performs the process in S1, the process in S2, and the process in S3 in FIG. 3. As a result, as illustrated in (h) of FIG. 8, read sense command (Rs) is selected as the command to be executed. The selected command (Rs) is executed by the memory chip of the bank #2 as shown in FIG. 9.

After that, as illustrated in (i) of FIG. 7, the command at the head of the command queue 241-0 is Do, the command at the head of the command queue 241-1 is Di, and the command at the head of the command queue 241-2 is Do. As a result, Do, Di, and Do are input to the arbiter 242, as illustrated in (i) of FIG. 8.

The arbiter 242 performs the process in S1, the process in S5, the process in S6, and the process in S7 in FIG. 3. As a result, as illustrated in (i) of FIG. 8, data-in command (Di) is selected as the command to be executed. The selected command (Di) is executed by the memory chip of the bank #1 as shown in FIG. 9.

After that, as illustrated in (j) of FIG. 7, the command at the head of the command queue 241-0 is Do, the command at the head of the command queue 241-1 is Pr, and the command at the head of the command queue 241-2 is Do. As a result, Do, Pr, and Do are input to the arbiter 242, as illustrated in (j) of FIG. 8.

The arbiter 242 performs (the process in S1 and the process in S2), and the process in S3 in FIG. 3. As a result, as illustrated in FIG. 8(j), Pr is selected as the command to be executed. The selected command (Pr) is executed by the memory chip of the bank #1 (FIG. 9).

After that, as illustrated in (k) of FIG. 7, the command at the head of the command queue 241-0 is Do, the command at the head of the command queue 241-1 is null (i.e., there is no command), and the command at the head of the command queue 241-2 is Do. As a result, Do, null, and Do are input to the arbiter 242, as illustrated in (k) of FIG. 8.

The arbiter 242 performs the process in S1, the process in S5, the process in S6, and the process in S7 in FIG. 3. As a result, as illustrated in (k) of FIG. 8, the data-out command (Do) of the lower stage is selected as the command to be executed. The selected command (Do) is executed by the memory chip of the bank #2 as shown in FIG. 9.

After that, as illustrated in (1) of FIG. 7, the command at the head of the command queue 241-0 is Do, the command at the head of the command queue 241-1 is null, and the command at the head of the command queue 241-2 is also null. As a result, only Do (or, alternatively, Do, null, null) is input to the arbiter 242, as illustrated in (1) of FIG. 8.

The arbiter 242 performs the process in S1, the process in S5, the process in S6, and the process in S7 in FIG. 3. As a result, as illustrated in (1) of FIG. 8, data-out command (Do) is selected as the command to be executed. The selected command (Do) is executed by the memory chip of the bank #0 as shown in FIG. 9.

By adopting the command determination method of preferentially executing a first-type command (which is a command having a long busy period), as illustrated in FIG. 9, a plurality of command signals can be continuously input over one I/O signal line without interruption. Therefore, according to the above-described embodiments, it is possible to improve the processing capacity of a memory system while also reducing the power consumption of the memory system.

Figure 10:
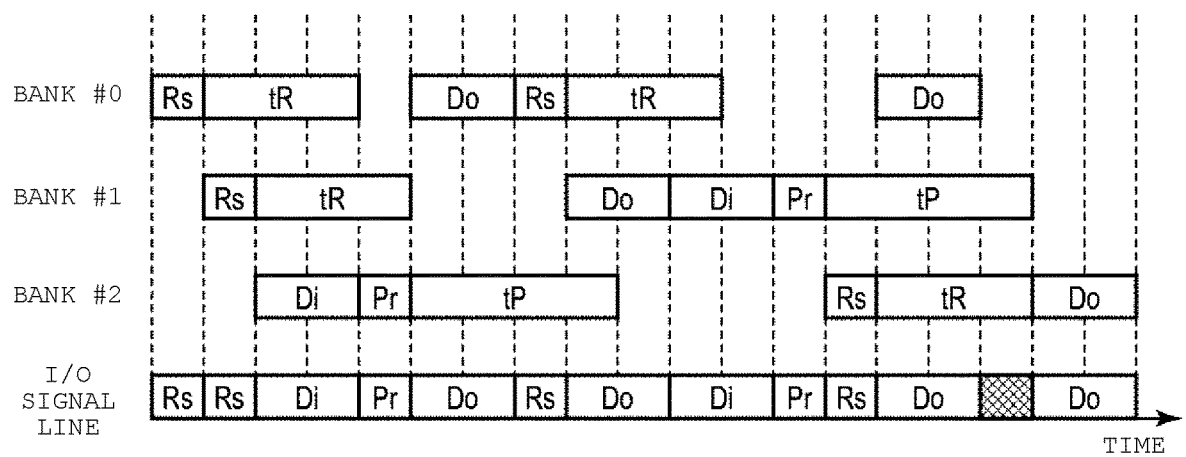
FIG. 10 is a timing chart illustrating an order of commands executed by a first command determination method according to a first comparative example.

Next, a command determination method according to a first comparative example will be described. FIG. 10 is a timing chart illustrating an order of commands executed by the command determination method according to the first comparative example. The command determination method according to the first comparative example is different from the first command determination method according to the above-described embodiments in that the method of preferentially executing a first-type command is not adopted. As illustrated in FIG. 10, in the command determination method according to the first comparative example, a period during which no command signal is input through an I/O signal line (a period with shaded-hatching) occurs.

Figure 11:
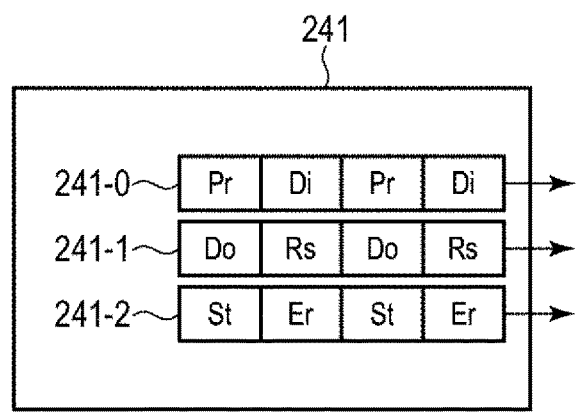
FIG. 11 depicts commands stored in a command queue according to an embodiment.

FIG. 11 is a diagram illustrating another example of commands stored in the queue unit 241 (i.e., the command queues 241-0, 241-1, and 241-2). FIG. 11 corresponds to FIG. 6. In FIG. 11, the notation "Rs" indicates a read sense command (a first-type command), "Do" indicates a data-out command (a second-type command), "Di" indicates a data-in command (a second-type command), "Er" indicates an erase command (a first-type command), and "St" is a status read command (a second-type command).

The time required for a read sense command or an erase command transmitted to the memory chip 110 to occupy an I/O signal line is shorter than the time required for a data-in command, a data-out command, or a status read command transmitted to the memory chip 110 to occupy the I/O signal line.

The busy period required for the memory chip 110 to execute the read sense command or the erase command is longer than the busy period required for the memory chip 110 to execute the data-in command, the data-out command, or the status read command.

Figure 12:
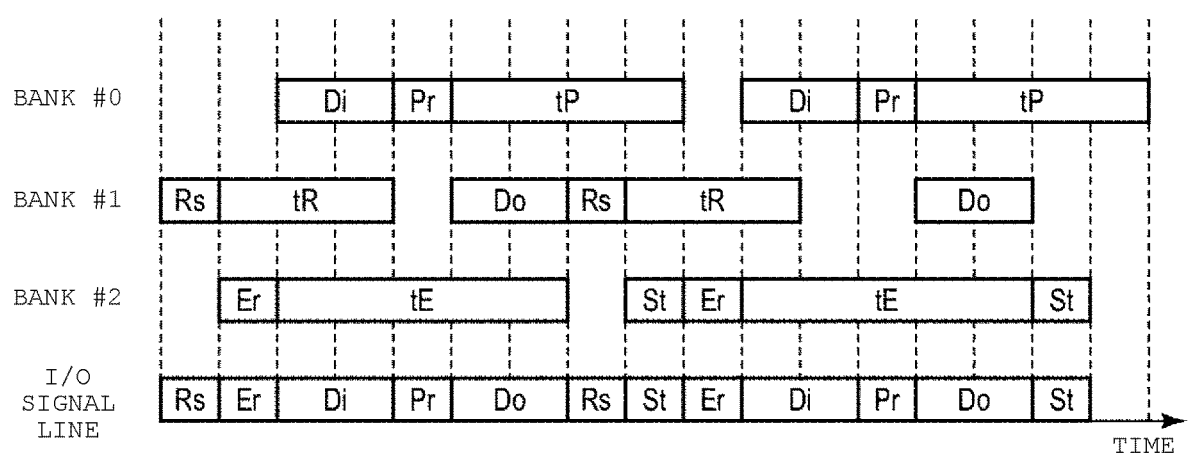
FIG. 12 is a timing chart illustrating an order of commands executed by a first command determination method according to an embodiment.

FIG. 12 is another timing chart illustrating the order of the commands executed by the first command determination method according to an embodiment. FIG. 12 corresponds to FIG. 9. As illustrated in FIG. 12, a plurality of command signals can be continuously input to one I/O signal line without interruption. Therefore, it is possible to improve a processing capacity and reduce power consumption of the memory system.

Figure 13:
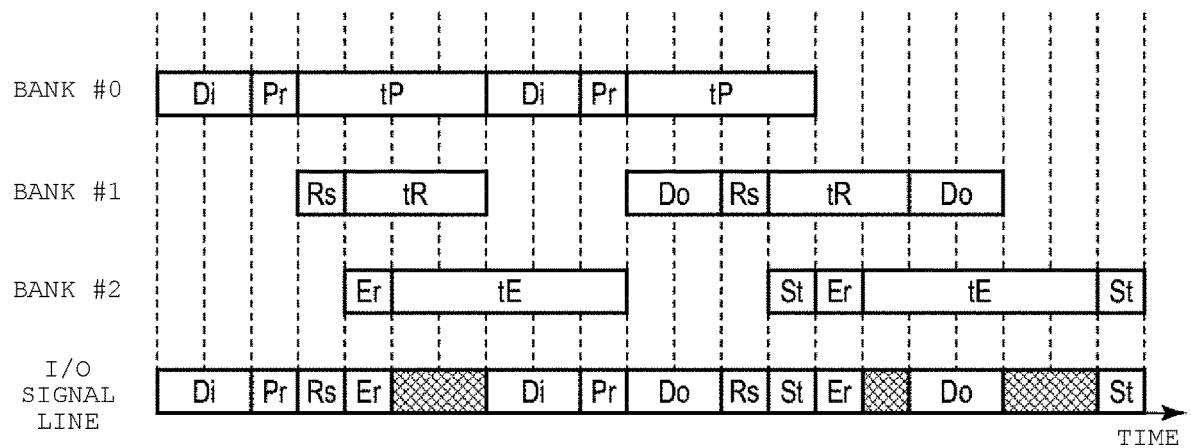
FIG. 13 is a timing chart illustrating an order of commands executed by a command determination method according to a second comparative example.

FIG. 13 is another timing chart illustrating an order of commands executed by a command determination method according to a second comparative example. The command determination method according to the second comparative example is different from the first command determination method according to the present embodiment in that the method of preferentially executing a first-type command is not adopted. As illustrated in FIG. 13, in the command determination method according to the second comparative example, three periods during which no command signal is input to the I/O signal line occur and these periods are indicated in the figure with shaded-hatching.

Figure 14:
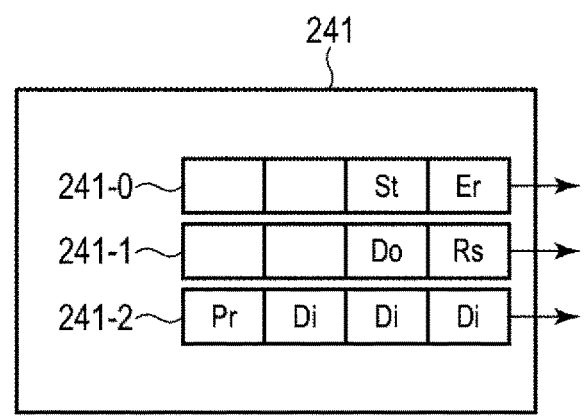
FIG. 14 depicts commands stored in a command queue according to an embodiment.

FIG. 14 is a diagram illustrating another example of the commands stored in the command queue 241-0, the command queue 241-1, and the command queue 241-2 according to an embodiment. In FIG. 14, the command queue 241-0 and the command queue 241-1 both have entries for which no command is stored.

Figure 15:
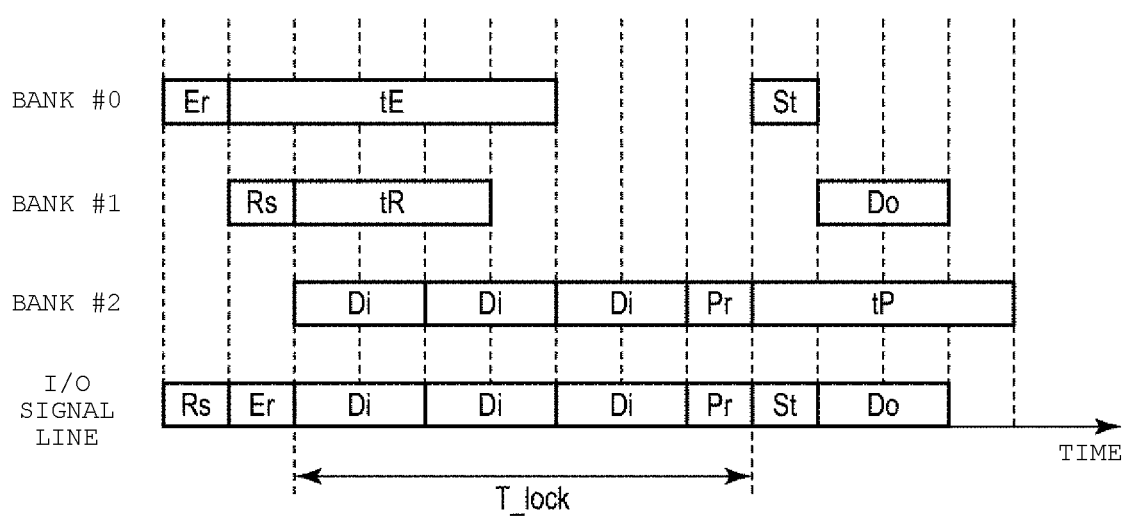
FIG. 15 is a timing chart illustrating an order of commands executed by a fourth command determination method according to an embodiment.

Next, the second command determination method according to an embodiment will be described. FIG. 15 is a timing chart illustrating an order of commands executed by the second command determination method.

The second command determination method according to an embodiment is different from the first command determination method according to the above-described embodiments in that selection of a bank from other than a specific bank is temporarily prohibited. In FIG. 15, during a period T-lock, the bank #2 is selected and the banks #0 and #1 are not selected. Even if the second command determination method according to this embodiment is used, a plurality of command signals can still be continuously input to the I/O signal line without interruption. Therefore, it is possible to improve a processing capacity and reduce power consumption of the memory system.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A memory system, comprising:
a non-volatile memory including a first memory chip and a second memory chip both connected to a first channel, each of the first memory chip and the second memory chip being configured to output a first signal indicating whether or not said each of the first memory chip and the second memory chip is in a busy state;
a first queue that stores commands to be executed by the first memory chip;
a second queue that stores commands to be executed by the second memory chip;
a processor configured to issue second signals, a first one of which indicates whether a command stored in the first queue is a first-type command or a second-type command, and a second one of which indicates whether a command stored in the second queue is a first-type command or a second-type command, the first-type command causing the first memory chip or the second memory chip to be in the busy state for longer than the second-type command;
a first arbiter configured to select, from the first queue and the second queue, a command to be executed next based on the first signal from each of the first memory chip and the second memory chip and the second signals issued by the processor; and a first memory interface controller configured to send, to the first memory chip or the second memory chip via the first channel, the selected command to be executed next, wherein the first arbiter is further configured to:
- determine whether a first-type command is stored at a head of one of the first queue and the second queue based on the second signals,
- when a first-type command is stored at a head of one of the first queue and the second queue, determine whether the first-type command is executable by one of the first memory chip and the second memory chip based on the first signal, and
- when the first-type command is executable, select the first-type command to be the selected command to be executed next.

2. The memory system according to claim 1, wherein the first arbiter determines whether the first-type command is executable by sequentially selecting one of a first bank to which the first memory chip belongs and a second bank to which the second memory chip belongs and determining whether the memory chip belonging to the selected bank is in the busy state.

3. The memory system according to claim 1, wherein the first arbiter is further configured to:
- when a first-type command is either not stored at a head of either one of the first queue and the second queue or, if stored at the head of one of the first queue and the second queue, not executable, determine whether a second-type command is stored at a head of one of the first queue and the second queue based on the second signals,
- when a second-type command is stored at a head of one of the first queue and the second queue, determine whether the second-type command is executable based on the first signal, and
- when the second-type command is executable, select the second-type command to be executed next.

4. The memory system according to claim 3, wherein the first arbiter determines whether the second-type command is executable by sequentially selecting one of a first bank to which the first memory chip belongs and a second bank to which the second memory chip belongs and determining whether the memory chip belonging to the selected bank is in the busy state.

5. The memory system according to claim 1, wherein the first-type command is a read sense command, a program command, or an erase command.

6. The memory system according to claim 5, wherein the second-type command is a data-out command, a data-in command, or a status read command.

7. The memory system according to claim 1, wherein the first channel includes one I/O signal line.

8. A memory system comprising:
- a non-volatile memory including a first memory chip and a second memory chip both connected to a first channel, each of the first memory chip and the second memory chip being configured to output a first signal indicating whether or not said each of the first memory chip and the second memory chip is in a busy state;
- a first queue that stores commands to be executed by the first memory chip;
- a second queue that stores commands to be executed by the second memory chip;
- a processor configured to issue second signals, a first one of which indicates whether a command stored in the first queue is a first-type command or a second-type command, and a second one of which indicates whether a command stored in the second queue is a first-type command or a second-type command, the first-type command causing the first memory chip or the second memory chip to be in the busy state for longer than the second-type command;
- a first arbiter configured to select, from the first queue and the second queue, a command to be executed next based on the first signal from each of the first memory chip and the second memory chip and the second signals issued by the processor;
- a first memory interface controller configured to send, to the first memory chip or the second memory chip via the first channel, the selected command to be executed next;
- a third queue and a fourth queue;
- a second arbiter; and
- a second memory interface controller, wherein
- the non-volatile memory further includes a third memory chip and a fourth memory chip both connected to a second channel, each of the third memory chip and the fourth memory chip being configured to output a third signal indicating whether or not said each of the third memory chip and the fourth memory chip is in the busy state,
- the third queue stores commands to be executed by the third memory chip,
- the fourth queue stores commands to be executed by the fourth memory chip,
- a third one of the second signals indicates whether a command stored in the third queue is a first-type command or a second-type command, and a fourth one of the second signals indicates whether a command stored in the fourth queue is a first-type command or a second-type command,
- the second arbiter is configured to select from the third queue and the fourth queue a command to be executed next based on the second signals issued by the processor and the third signal from each of the third memory chip and the fourth memory chip, and
- the second memory interface controller is configured to cause the third memory chip or the fourth memory chip to execute the selected command via the second channel.

9. The memory system according to claim 8, wherein the first memory chip and the third memory chip belong to a first bank of the non-volatile memory, and the second memory chip and the fourth memory chip belong to a second bank of the non-volatile memory.

10. A method performed by a memory system that includes a non-volatile memory including a first memory chip and a second memory chip both connected to a first channel, the method comprising:
- storing a command to be executed by the first memory chip in a first queue;
- storing a command to be executed by the second memory chip in a second queue;
- outputting from each of the first memory chip and the second memory chip a first signal indicating whether or not said each of the first memory chip and the second memory chip is in a busy state;
- issuing second signals, a first one of which indicates whether a command stored in the first queue is a first-type command or a second-type command, and a second one of which indicates whether a command stored in the second queue is a first-type command or a second-type command, the first-type command causing the first memory chip or the second memory chip to be in the busy state for longer than the second-type command;

selecting, from the first queue and the second queue, a command to be executed next based on the first signal and the second signals; and transmitting, to the first memory chip or the second memory chip via the first channel, the selected command to be executed next, wherein selecting includes:
determining whether a first-type command is stored at a head of one of the first queue and the second queue based on the second signals, when a first-type command is stored at a head of one of the first queue and the second queue, determining whether the first-type command is executable by one of the first memory chip and the second memory chip based on the first signal, and when the first-type command is executable, selecting the first-type command to be the selected command to be executed next.

11. The method according to claim 10, wherein determining whether the first-type command is executable includes sequentially selecting one of a first bank to which the first memory chip belongs and a second bank to which the second memory chip belongs and determining whether the memory chip belonging to the selected bank is in the busy state.

12. The method according to claim 10, wherein selecting further includes:
when a first-type command is not stored at a head of one of the first queue and the second queue or, if stored at a head of one of the first queue and the second queue, is not executable, determining whether a second-type command is stored at a head of one of the first queue and the second queue based on the second signals, when a second-type command is stored at a head of one of the first queue and the second queue, determining whether the second-type command is executable based on the first signal, and when the second-type command is executable, selecting the second-type command to be executed next.

13. The method according to claim 12, wherein determining whether the second-type command is executable includes sequentially selecting one of a first bank to which the first memory chip belongs and a second bank to which the second memory chip belongs and determining whether the memory chip belonging to the selected bank is in the busy state.

14. The method according to claim 10, wherein the first-type command is a read sense command, a program command, or an erase command.

15. The method according to claim 14, wherein the second-type command is a data-out command, a data-in command, or a status read command.

16. The method according to claim 10, wherein the first channel includes one I/O signal line.

17. A method performed by a memory system that includes a non-volatile memory including a first memory chip and a second memory chip both connected to a first channel, the method comprising:
storing a command to be executed by the first memory chip in a first queue;
storing a command to be executed by the second memory chip in a second queue;
outputting from each of the first memory chip and the second memory chip a first signal indicating whether or not said each of the first memory chip and the second memory chip is in a busy state;
issuing second signals, a first one of which indicates whether a command stored in the first queue is a first-type command or a second-type command, and a second one of which indicates whether a command stored in the second queue is a first-type command or a second-type command, the first-type command causing the first memory chip or the second memory chip to be in the busy state for longer than the second-type command;
selecting, from the first queue and the second queue, a command to be executed next based on the first signal and the second signals; and
transmitting, to the first memory chip or the second memory chip via the first channel, the selected command to be executed next, wherein
the non-volatile memory further includes a third memory chip and a fourth memory chip both connected to a second channel, and
the method further comprises:
storing a command to be executed by the third memory chip in a third queue,
storing a command to be executed by the fourth memory chip in a fourth queue,
outputting from each of the third memory chip and the fourth memory chip a third signal indicating whether or not said each of the third memory chip and the fourth memory chip is in the busy state,
selecting, from the third queue and the fourth queue, a command to be executed next based on the second signals and the third signal, a third one of the second signals indicating whether a command stored in the third queue is a first-type command or a second-type command, a fourth one of the second signals indicating whether a command stored in the fourth queue is a first-type command or a second-type command, and
transmitting the selected command via the second channel to the third memory chip or the fourth memory chip.

18. The method according to claim 17, wherein the first memory chip and the third memory chip belong to a first bank of the non-volatile memory, and the second memory chip and the fourth memory chip belong to a second bank of the non-volatile memory.

* * * * *